(12) United States Patent
Baidya et al.

(10) Patent No.: US 11,301,982 B2
(45) Date of Patent: Apr. 12, 2022

(54) IMAGE MORPHING TO MEET DESIRED CONSTRAINTS IN GEOMETRIC PATTERNS

(71) Applicant: Intel Corporation, Santa Clara, CA (US)

(72) Inventors: Bikram Baidya, Portland, OR (US); Hale Erten, Portland, OR (US); Allan Gu, Portland, OR (US); John A. Swanson, Forest Grove, OR (US); Vivek K. Singh, Portland, OR (US); Abde Ali Hunaid Kagalwalla, Hillsboro, OR (US); Mengfei Yang-Flint, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 117 days.

(21) Appl. No.: 16/557,782

(22) Filed: Aug. 30, 2019

(65) Prior Publication Data
US 2019/0385300 A1  Dec. 19, 2019

(51) Int. Cl.
*G06T 7/00* (2017.01)
*G06T 3/00* (2006.01)
*G06N 20/00* (2019.01)
*G06T 7/60* (2017.01)

(52) U.S. Cl.
CPC .......... *G06T 7/0006* (2013.01); *G06N 20/00* (2019.01); *G06T 3/0093* (2013.01); *G06T 7/60* (2013.01); *G06T 2207/30148* (2013.01)

(58) Field of Classification Search
CPC ....... G06T 7/0006; G06T 3/0093; G06T 7/60; G06T 2207/30148; G06N 20/00
USPC ........................................................ 382/145
See application file for complete search history.

(56) References Cited

U.S. PATENT DOCUMENTS 4,414,635 A * 11/1983 Gast .......................... G01J 3/46
382/165

OTHER PUBLICATIONS

Wang "Perceptual Adversarial Networks for Image-to-Image Transformation", IEEE 2018 (Year: 2018).*
ImageProcessing.com 2017 (Year: 2017).*
Bossu "Rain or Snow Detection in Image Sequences Through Use of a Histogram of Orientation of Streaks", IJCV 2011 (Year: 2011).*
Kokaram "Detection of Missing Data in Image Sequences", IEEE 1995 (Year: 1995).*
Artwork.com (Year: 2017).*

* cited by examiner

*Primary Examiner* — Mark Roz
(74) *Attorney, Agent, or Firm* — Alliance IP, LLC

(57) ABSTRACT

A method includes identifying a first geometric pattern that failed a design rule check, identifying a second geometric pattern that passed the design rule check, morphing the first geometric pattern based on the second geometric pattern to generate a morphed geometric pattern, wherein the morphed geometric pattern passes the design rule check, and replacing the first geometric pattern with the morphed geometric pattern.

14 Claims, 8 Drawing Sheets

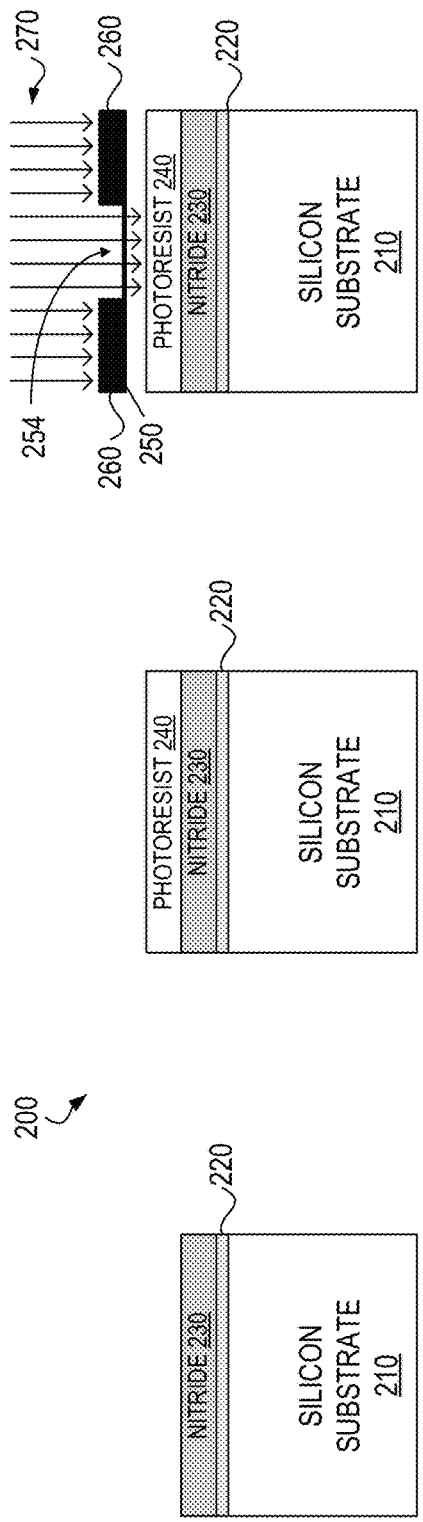
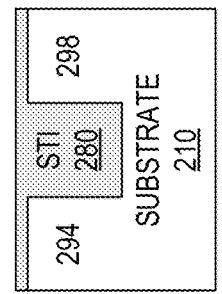
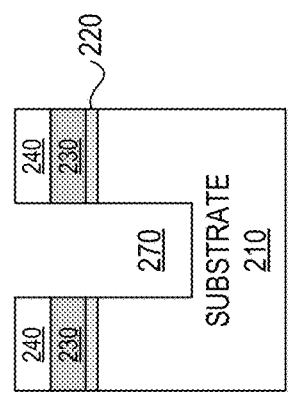
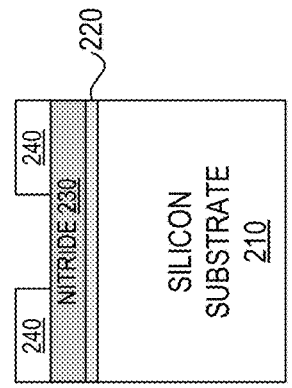

IMAGE MORPHING TO MEET DESIRED CONSTRAINTS IN GEOMETRIC PATTERNS

TECHNICAL FIELD

This disclosure relates in general to the field of computing systems and, more particularly, to image morphing to meet desired constraints in geometric patterns.

BACKGROUND

Cutting-edge semiconductor manufacturing processes are terribly complex. Housed in billion-dollar factories and comprising hundreds of processing steps to yield a finished device, they are capable of reliably printing features as small as 10 nm hundreds of billions of times across wafers that extend a foot in diameter. Developing a new semiconductor manufacturing process requires defining a set of design rules that establish constraints that a semiconductor device must follow to ensure manufacturability. Process development also involves developing optical proximity correction (OPC) recipes that adjust physical design features before they are printed on a mask to help counter feature distortions caused by various processing steps.

BRIEF DESCRIPTION OF THE DRAWINGS

FIGS. 2A-2F illustrate an exemplary photolithography process in accordance with certain embodiments.

Like reference numbers and designations in the various drawings indicate like elements.

DESCRIPTION OF EXAMPLE EMBODIMENTS

Figure 1A:
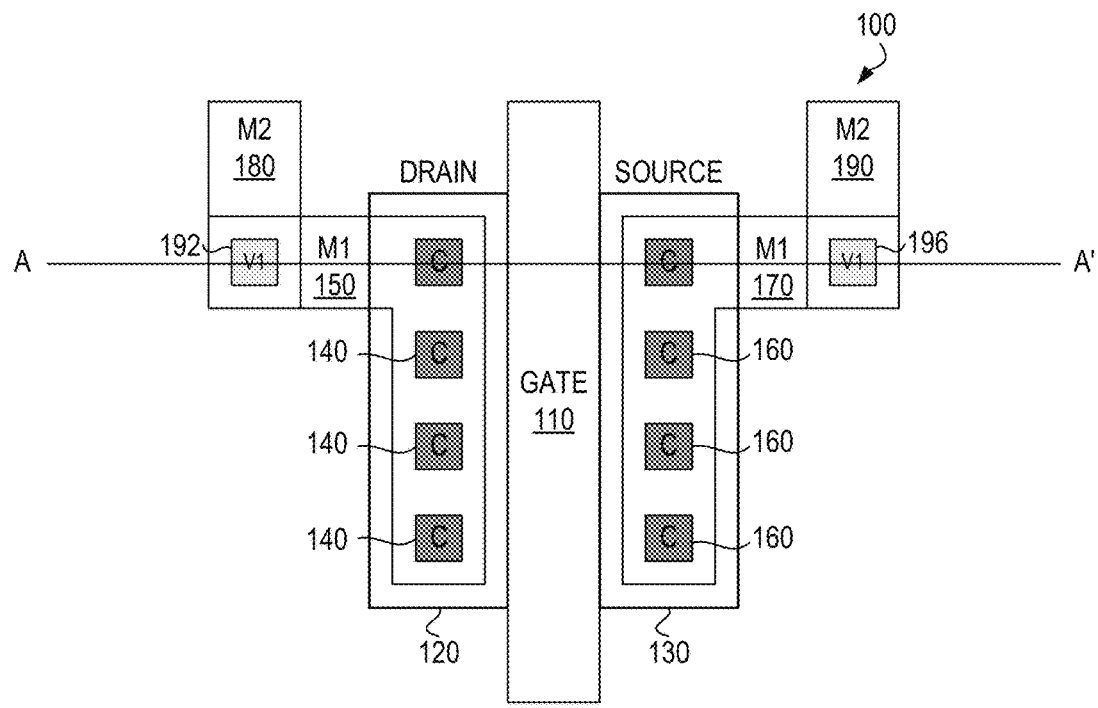
FIG. 1A illustrates the physical design of an exemplary planar transistor in accordance with certain embodiments.

Semiconductor manufacturing has become increasingly complex over the years. Since the turn of the century, the minimum feature size has shrunk by over an order of magnitude as the industry has progressed from the 130 nanometer (nm) to 10 nm technology nodes. At the same time, processor complexity has dramatically increased. Current flagship products have transistor counts that well exceed 10 billion. To handle these reduced feature sizes and increased chip complexities, companies must invest billions of dollars and years of research to build state-of-the-art fabrication facilities. Research and development costs are driven ever-upward by the rising cost of increasingly sophisticated equipment needed for advanced processes. The industry has taken steps to decrease per-transistor manufacturing costs (for example, by moving from 200 mm to 300 mm wafers at the 90 nm technology node), but the overall trend has been for each process generation to cost more than the last. With up to hundreds of individual dies on wafers that span a foot in diameter, the total number of transistors that can be printed on a wafer is on the order of one trillion. Developing high-volume manufacturing processes that can reliably manufacture transistors at such an extreme scale presents considerable challenges.

One such challenge is discovering the patterns and geometries in a physical design responsible for limiting process yield. Manufacturing defects can be discovered through analysis of images generated by an imaging tool during wafer manufacturing, but the amount of image data that is to be analyzed to locate defects can be tremendous (up to millions of images). As a process matures, the presence of a manufacturing defect in the mountain of image data that can be generated may be a rare event. Once defects are located, determining whether a particular physical design pattern or geometry is responsible for a class of defects is another difficult task, particularly considering the amount of data that to be analyzed.

The technologies described herein extract semantic patterns from large amounts of silicon data to aid in semiconductor manufacturing process development. Large numbers of images are analyzed for the presence of manufacturing defects in areas of interest on a wafer. A continuous itemset is generated with items containing the values of physical design features corresponding to the areas of interest and an event value indicating the presence or absence of a manufacturing defect at that location. Entropy-based discretization is performed on the discretized itemset to generate a set of candidate semantic patterns. As used herein, the phrase "semantic pattern" refers to one of more sentences or phrases describing constraints on one or more physical design feature values. A semantic pattern can describe a single value for a feature, "gate length=20 nm," a range of values for a feature, "gate endcap space 18 nm," and constraints for multiple features, "gate length=20 nm, gate endcap space 18 nm."

The set of candidate semantic features is reduced to a set of final semantic features that are ranked and presented to a user, such as a process engineer. The semantic features can be ranked based on their accuracy, coverage, interpretability, and independence. Generally, top-ranked semantic patterns are generally those that do a good job of explaining manufacturing defects (the patterns are accurate and provide good defect coverage, as will be discussed in greater detail below) and are simple for a user to understand. The user can use extracted semantic patterns to improve a process by updating the design rule set for a process, improving an optical proximity correction (OPC) recipe, or in other manners.

Reference is now made to the drawings, wherein similar or same numbers may be used to designate same or similar parts in different figures. The use of similar or same numbers in different figures does not mean all figures including similar or same numbers constitute a single or same embodiment.

Turning now to FIGS. 1-3, an overview of various aspects of semiconductor device manufacturing is presented. FIG. 1A illustrates the physical design of an exemplary planar transistor. As will be discussed in greater detail below, the physical design of a transistor is used to generate the masks that will be used during manufacturing to print the features on a wafer needed to implement a particular design. The physical design is typically a set of polygons drawn at various layers, such as a gate layer, contact layer, and metal-1 layer.

Transistor 100 is a field-effect-transistor (FET), the transistor type that comprises the bulk of transistors used in modern semiconductor devices. Transistor 100 comprises gate 110, drain 120, and source 130 regions. The gate region in a FET can be thought of as an "on-off" switch that controls the flow of current between drain and source regions. When gate 110 is "off", there is no (or little) current flowing through a channel region that connects drain 120 to source 130 and when gate 110 is "on", current readily flows through the channel region. Transistor 100 is connected to other transistors by a set of interconnect layers stacked vertically on top of transistor 100. Contacts 140 connect drain 120 to segment 150 of a first metal layer (M1), and contacts 160 connect source 130 to M1 segment 170. M1 segments 150 and 170 are in turn connected to a second metal layer (M2) segments 180 and 190 by a first layer of "vias" (V1) 192 and 196, respectively. In general, metal layer thickness increases as one moves up the interconnect stack, with thinner lower-level metals being generally used for the local routing of signals and thicker upper-level metals being used for global signal routing and power/ground planes. For simplicity, FIG. 1A shows only two levels of metal. Current semiconductor manufacturing processing have up to ten layers of metal interconnects.

Figure 1B:
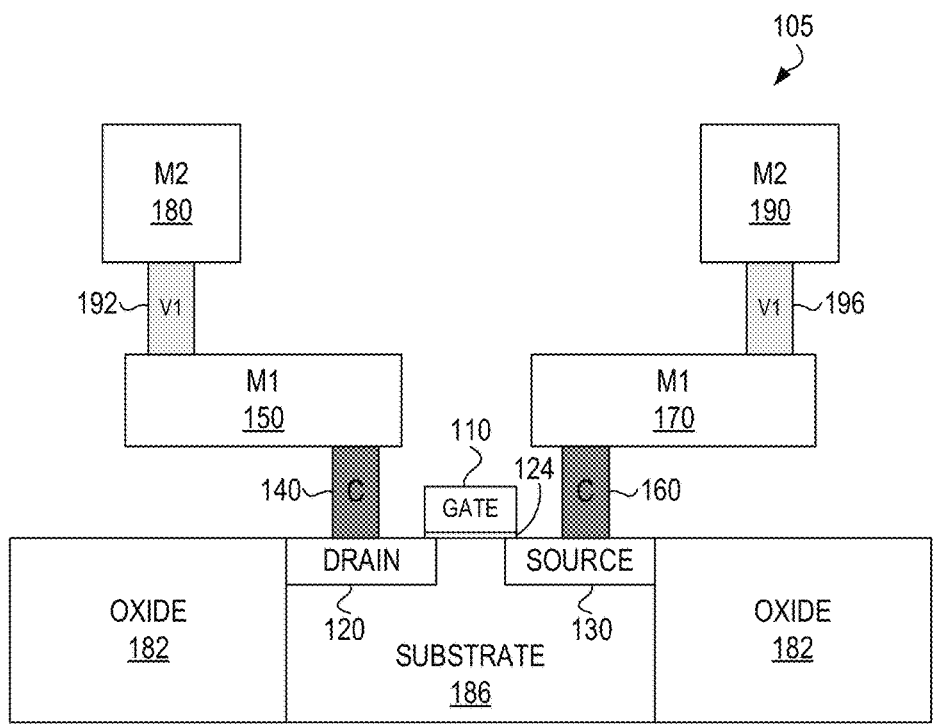
FIG. 1B illustrates an exemplary cross-section of the planar transistor of FIG. 1A taken along the line A-A' in accordance with certain embodiments.

FIG. 1B illustrates an exemplary cross-section of the planar transistor of FIG. 1A taken along the line A-A'. Cross-section 105 shows gate 110 separated from drain 120 and source 130 regions by high-k dielectric layer 124, which electrically insulates gate 110 from drain 120 and source 130. Transistor 100 is in substrate region 186 and is insulated from adjacent transistors by oxide regions 182. The planar transistor illustrated in FIGS. 1A and 1B is just one type of transistor topography, the planar nature of the transistor reflecting that the gate, source, and drain regions are located on or are adjacent to a relatively planar surface. Another type of transistor topography is the non-planar transistor topography used in FinFETS, which are used extensively in cutting-edge manufacturing processes. FinFETS are field-effect transistors that operate under the same general principle as planar FET transistors—a gate controls the flow of current between drain and source region—with the variation that the gate wraps around a set of fins that extend vertically upwards from the wafer surface.

Essential to semiconductor manufacturing is the process of photolithography, by which patterns are transferred from a mask onto a wafer. As previously mentioned, masks are used to define the shape and location of various features to be patterned on a wafer for a given process layer. For example, one mask defines where oxide regions are located, another mask defines where high-k dielectrics will be located, another mask defines location of source and drain regions, and yet another mask will define where contacts will be placed. Additional masks may be used to define each metal layer and intervening via layers.

FIGS. 2A-2F illustrate an exemplary photolithography process. Process 200 illustrates how the oxide regions 182 in FIG. 1B can be defined using photolithography. In FIG. 2A, a thin silicon dioxide layer 220 is thermally grown across the top of silicon substrate 210 of a wafer. Silicon nitride layer 230, a protective layer, is deposited on top of silicon dioxide layer 220. In FIG. 2B, photoresist 240 is deposited on top of nitride layer 230. A photoresist is a material whose reactance to an etchant or solvent increases (if a positive photoresist) or decreases (negative photoresist) upon exposure to light. In process 200, photoresist 240 is a positive photoresist. In FIG. 2C, mask 250 with patterns 260 is positioned over the wafer and exposed to light. The light passes through transparent region 254 of mask 250 and exposes photoresist 240. Patterned regions 260 are opaque to the light and the photoresist regions under patterns 260 are not exposed. In FIG. 2D, photoresist 240 is chemically developed and the exposed regions are dissolved. The remaining portions of photoresist 240 can now act as an on-wafer mask to allow for selective processing of the wafer. In FIG. 2E, the wafer is subjected to an etch step that removes a portion of the silicon nitride layer 230, silicon dioxide layer 220, and substrate 210 to create trench 270. In FIG. 2F, the photoresist and nitride layers are removed, and trench 270 is filled with silicon dioxide to create shallow trench isolation (STI) region 280 that serve to keep transistors formed in regions 294 and 298 electrically isolated from each other.

As masks are the means by which features are realized in semiconductor devices, any semiconductor device design must ultimately be reduced to a physical design, the level of design abstraction from which masks are be generated. The physical design of a transistor (such as FIG. 1A), circuit, or processor to be manufactured is often referred to as a "layout." Electronic design automation (EDA) tools allow processor architects and circuit designers to design at levels of abstraction above the physical design level. They are thus spared from having to spend their days drawing polygons in layout tools to realize their designs. Architects typically define their designs using a hardware design language (HDL), such as VHDL or Verilog. Once they have verified that their designs perform as desired, a physical design can be generated automatically using a library of standard layout cells. Circuit designers often seek performance or functionality not available using standard cells and often enter their designs into a schematic capture tool. Once their custom designs are finalized, the circuit schematics are handed off to layout designers who manually craft the custom physical designs.

Regardless of whether a physical design is generated automatically or manually it must conform to a set of layout design rules established for a manufacturing process. Design rules are constraints that a physical design must follow to ensure manufacturability with an acceptable yield. The rules may specify enough margin such that variability inherent in the manufacturing process will not result in chip failure at an unsuitably high rate. A design rule may specify constraints within a single layer or within multiple layers. As examples, a design rule may specify a minimum width of a feature ("gate length≥10 nm"), a minimum distance between two features (e.g., "space between metal-1 traces ≥20 nm"), an enclosure rule specifying that a feature (e.g., a contact or via) is covered (e.g., by a metal layer) (e.g., source/drain diffusion enclosure of a contact ≥16 nm), a minimum area for a feature, antenna rules specifying ratios of areas of multiple layers, or other suitable rules.

Design rules represent a trade-off between feature density and manufacturability. Being able to print smaller feature sizes can mean more die can be packed onto a wafer but if the process cannot reliably print the smaller features, the resulting reduction in wafer yield can more than offset cost reduction gained by being able to print more die on a wafer.

Developing design rules for a new process can be difficult as unexpected difficulties can arise. For example, a feature may not scale as much as expected from the previous technology generation due to unforeseen difficulties with a new processing step or a new tool. As process engineers develop a new manufacturing process, they continually fine-tune the individual processing steps to remove as many defect sources as possible. At some point, the process has been tuned enough that the remaining defects that need to be rooted out occur so infrequently that they are difficult to find. Process engineers need to find the occurrence of these rare events during process development so that they can determine whether a tweak to the process can be figured out to reduce the occurrence of the rare event, or to add a design rule to the design rule set so that physical design geometries and patterns correlated to a specific defect are kept out of the final physical design.

Once a physical design is clear of design rule violations and has passed other design validation checks, it is passed to the mask generation phase of an EDA flow. The mask generation phase is far from trivial due to the large discrepancy between the wavelength of the light ($\lambda$=193 nm) that has been used since the 90 nm technology node and the minimum feature sizes (10 nm) used in the current processes. The minimum feature size that can be printed clearly in a photolithographic process is limited by the wavelength of the light source used and the semiconductor industry has developed resolution enhancement technologies (RET) to allow for the printing of features well below the 193 nm light source wavelength. A first set of RET techniques works to increase resolution and/or depth of focus, and a second set compensates for distortion effect due to printing features with a wavelength larger than minimum feature sizes as well as those inherent in deposition, etching, and other process steps. The first set includes techniques such as phase-shift masks and double-patterning, and the second set includes optical proximity correction (OPC).

Figure 3A:
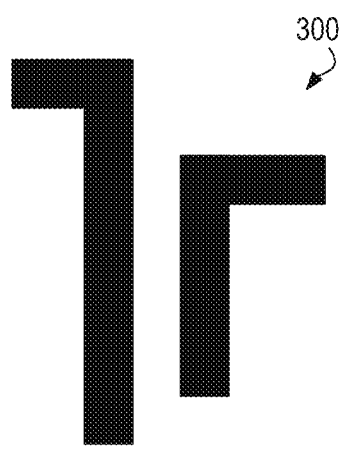
FIGS. 3A-3D illustrate differences between features printed on a mask and those processed on a wafer due to process distortion effects and the use of optical proximity correction to counter those effects in accordance with certain embodiments.
Figure 3B:
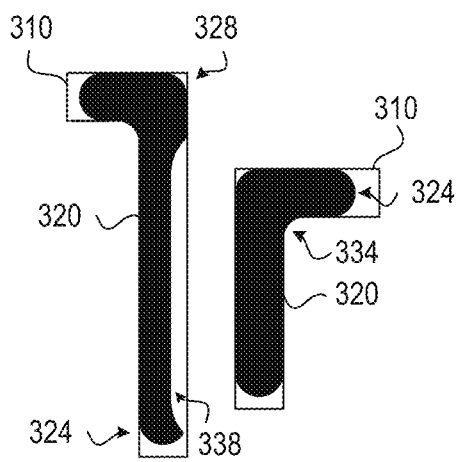
Figure 3C:
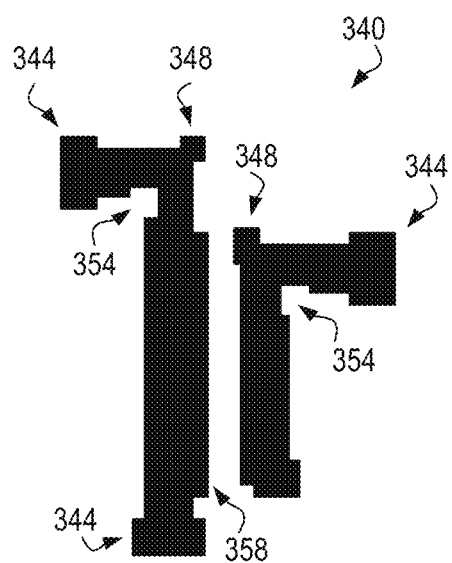
Figure 3D:
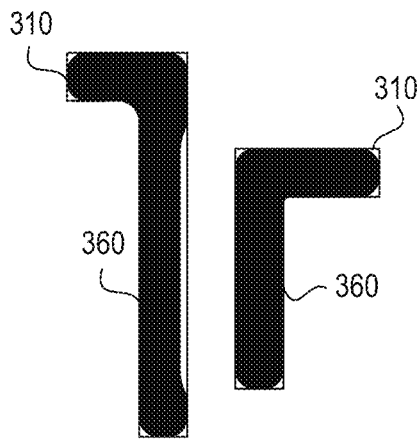

FIGS. 3A-3D illustrate differences between features printed on a mask and those processed on a wafer due to process distortion effects and the use of optical proximity correction to counter those effects. FIG. 3A illustrates two gate polygons 300 in a physical design before being subjected to an OPC process. FIG. 3B illustrates a simplified view of how polygons 300 may appear as processed on a wafer. Outlines 310 represent the boundaries of polygons 300 and shapes 320 represent the corresponding as-processed features. It can be seen that ends 324 and exterior corners 328 of shapes 320 are rounded off, interior corners 334 are filled in, and segment 338 narrowed due to a nearby feature. FIG. 3C illustrates exemplary modified polygons 340 generated by subjecting polygons 300 to an OPC process. Modified polygons 340 are much more complex than original polygons 300. Modified polygons 340 include "dog-bone" features 344 that compensate for end-rounding, "ear" features 348 that compensate for exterior corner-rounding, "mouse-bite" features 354 that compensate for interior corner-rounding, and thickening features 358 that compensate for the presence of nearby features. FIG. 3D illustrates a simplified view of how modified polygons 340 may appear on a wafer after processing. Outlines 310 again represent the boundaries of original polygons 300. As can be seen, modification of polygons 300 by the OPC process results in printed shapes 360 that are closer to the shape and size of original polygons 300. The ends and corners of shapes 360 are less rounded off, the interior corners are less filled in, and the impact of nearby neighbors is diminished.

While OPC generation (and other RET techniques) have allowed minimal features to scale with technology node as the wavelength of the photolithographic light source has remained constant, it does not come without its costs. OPC generation is computationally intensive. OPC recipes can be based on physical models of various processing steps (photolithography, diffusion, etch, deposition, etc.), or be rule-based models that generate OPC features based on individual physical design feature characteristics (width, length, shape, nearest-neighbor characteristics) without relying on the physics of the underlying process steps. The application of model-based OPC recipes to a complete physical design may involve the application of physical models to over 10 billion shapes at the gate layer alone and to billions of additional shapes on other layers. Further, the generation of rule-based OPC models, which may save some of the computational complexity of model-based OPC generation, can be a complex affair. Generation of rule-based OPC recipes can be based on trial-and-error due to a lack of full understanding of the complex physics and chemistries at play in the development of cutting-edge processing technologies. This trial-and-error can comprise iteratively manufacturing features with many variations of candidate OPC recipes and seeing which recipes produce the best results.

Figure 4:
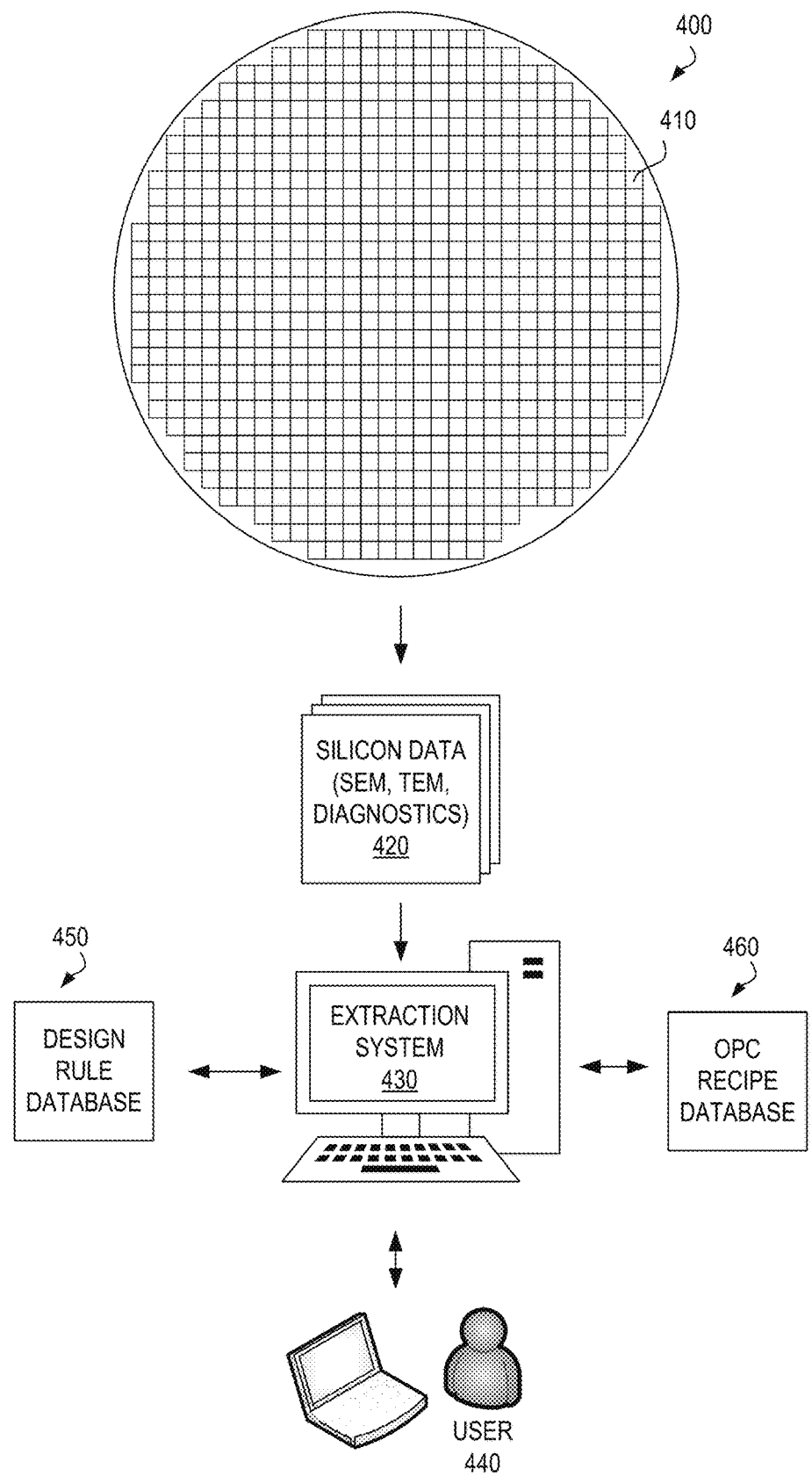
FIG. 4 illustrates an embodiment of silicon data capture and utilization of silicon data to aid semiconductor manufacturing process development in accordance with certain embodiments.

FIG. 4 illustrates an embodiment of silicon data capture and utilization of silicon data to aid semiconductor manufacturing process development. Silicon wafer 400 comprises dies 410. As discussed earlier, current technology nodes employ 300 mm wafers, which can comprise hundreds of dies. The dies are separated by scribe lines that can contain test structures that can be used to monitor the health of manufacturing process and that are consumed by the dicing process, where a wafer is cut into individual dies 410. During the manufacture of silicon wafer 400, silicon data 420 can be generated that can be used for the development of a new process or to monitor the health of a mature one. Silicon data 420 can be any data collected during the manufacturing of wafer 400, such as diagnostic data or images captured by an imaging tool such as a such as a scanning electron microscope (SEM), a transmission electron microscope (TEM), a scanning transmission electron microscope (STEM), or a focus ion beam microscope (FIB). Diagnostic data can include data collected from the scribe line test structures, which can measure electrical properties of varies features or layers (e.g., contact or via resistance, metal layer sheet resistance), or indicate the presence of manufacturing defects by testing for shorts between, for example, gate or metal structures that reflect minimum features or layout patterns of concern.

Any number of images can be generated per wafer. Images can be taken of one or more areas of interest on an individual die for various die on a wafer. For example, images may be taken of the gate layer in a region where the gate patterns are particularly dense (such as in a memory array) and for representative dies across the wafer to capture cross-wafer manufacturing variations. Images can be taken at any point in the manufacturing process. As images can capture a field of view that is hundreds of microns in length and width, individual images can contain many instances of minimum features or areas of interest.

Silicon data 420 can be generated for wafers processed during process development or monitoring and can be generated for wafers processed across fabrication facilities to evaluate cross-facility manufacturing robustness. Given today's large wafer sizes, process complexities, and wafer run rates, the amount of silicon data that can produced during process development or monitoring can be tremendous. The number of images generated during process development alone can reach into the millions.

Silicon data 420 can be supplied to a semantic pattern extraction system 430 that digests copious amounts of silicon data and presents to a process engineer or other user 440 information that may useful in developing a new process or improving an existing one. In some examples, the information provided can be semantic patterns (phrases or sentences that are easily understandable by a human) that suggest which physical design patterns or geometries may be responsible for a defect. In other examples, system 430 can utilize the silicon data 420 to determine one or more design rules that may improve process yield and update design rule database 450 for a process or update an OPC recipe database 460 by updating an existing OPC recipe or creating a new one that may improve yield.

During the design process, patterns of a chip may be checked against design rule constraints, such as those described above, to determine whether the patterns are clean patterns (e.g., patterns that comply with all design rules) or dirty patterns (e.g., patterns that violate one or more design rules). Ensuring that all of the patterns of a design meet the design rules may requires weeks of manual work by circuit designers, as the designers modify the layout of the dirty patterns to conform with the design rules. Some systems may attempt to automate the process by encoding the constraints of the design rules into a constraint solver (e.g., a linear or convex constraint solver) and iteratively modifying a dirty pattern to satisfy the constraints. However, such approaches may be limited to simple convex constraints and thus may not be suitable for modification of all of the patterns of a complex chip.

In various embodiments of the present disclosure, a system implements an automated learning-based method to generate clean patterns based on a dirty pattern. The clean patterns may be generated by morphing the dirty pattern based on clean patterns in a database. In some embodiments, a selection of the generated clean patterns may be presented to a user for selection and the selected clean pattern is used to replace the dirty pattern. Particular embodiments directed to semiconductor product layouts may help semiconductor design teams meet stringent product deadlines by assisting them to quickly fix all design rule violations.

In a particular embodiment, a pattern includes one or more layout features of a semiconductor chip design, such as a geometric design pattern for an area defined in a layout database file. Any suitable database file format may be used for the layout database file, such as Graphic Data System II (GDS II), Open Artwork System Interchange Standard (OASIS), or other suitable format. A layout database file may provide a representation of a semiconductor chip in terms of planar geometric shapes (e.g., polygons) corresponding to patterns of, e.g., metal, oxide, or semiconductor layers of the chip. A layout database file may represent the physical placement of various devices on the chip. Such a file may specify the presence or absence of various features on different mask layers for masks used to produce the chip.

Thus, in a particular embodiment, each pattern may correspond to one or more particular geometric polygons within an area represented by a portion of a layout database file. A pattern may be defined by the contents of one or more layers of the chip. A pattern may be unique within the chip or may be repeated any number of times across the chip (e.g., dozens of times, hundreds of times, thousands of times, or more). In some embodiments, a chip may include tens of thousands of unique patterns. In other embodiments, a chip may include additional or fewer unique patterns.

A pattern may include information about inter-polygon relationships. For example, a pattern may include all or a portion of a particular polygon (referred to as an anchor point) within a particular window, where the window may have any suitable shape (e.g., square, other rectangle, circle, or other shape) or size. In some embodiments, a pattern may be defined by an anchor point and zero or more polygons within a window around the anchor point. In various embodiments, the anchor point may correspond to a portion of a chip element, such as a via pillar, a line end of a metal line, a portion of a transistor such as a source, drain, or gate, or suitable chip element or portion thereof.

A pattern may be defined in any suitable manner with respect to the various layers of the chip. For example, some patterns may include only polygons in the same layer as the anchor point, while other patterns may include polygons within multiple layers (e.g., layers that are adjacent to the layer of the anchor point). Thus, the window around the anchor point could be in the same layer as the anchor point, could be in one or more different layers, or could be in the same layer and one or more different layers. The number of mask layers included to define particular patterns may depend on the particular type of defect being analyzed and the measurements being made. As just one example, when a pattern includes a via pillar rectangle as an anchor point, the pattern may also include metal line layers above and below the via pillar rectangle.

Figure 5:
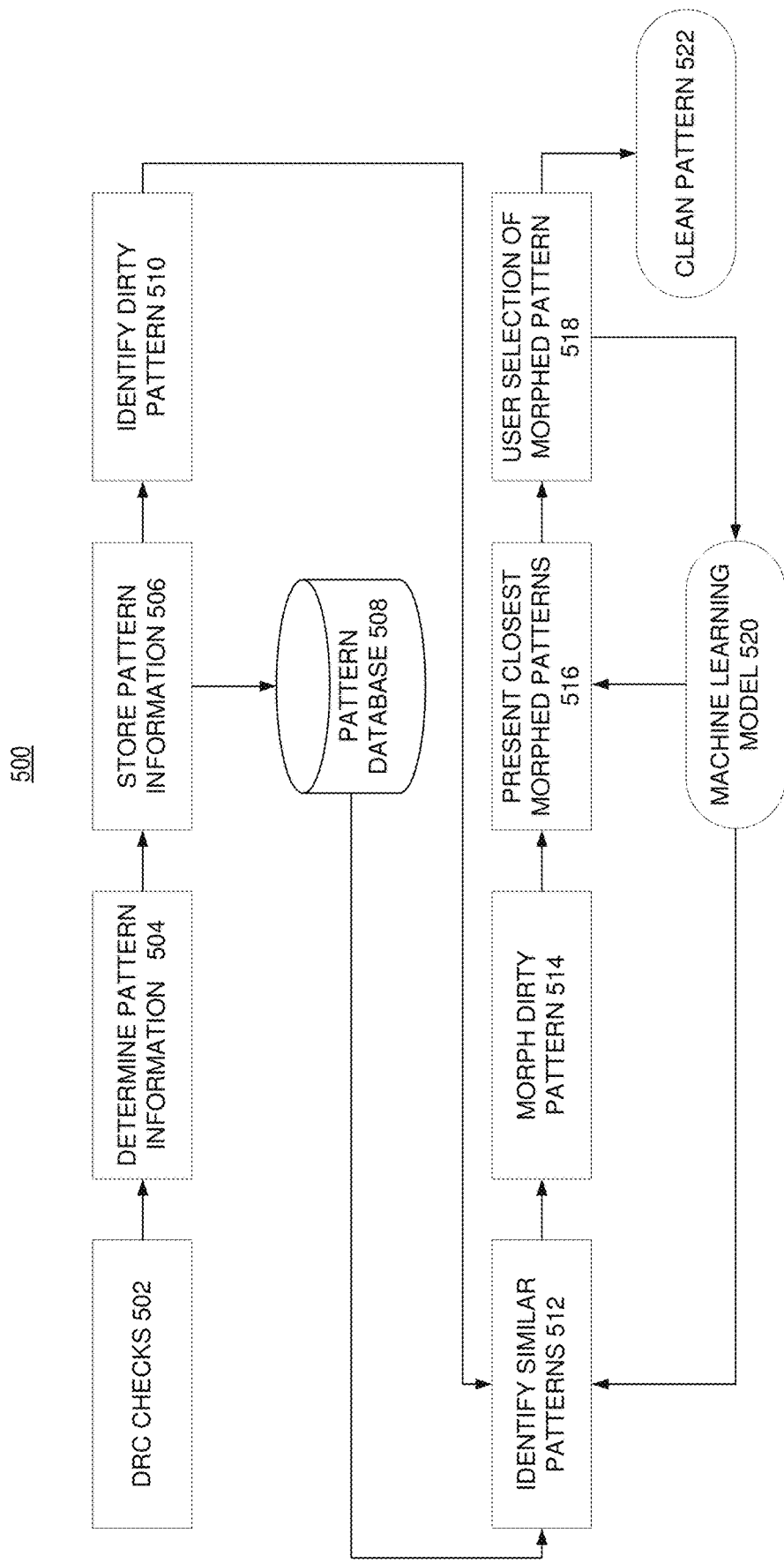
FIG. 5 illustrates a flow for image morphing to meet desired constraints in geometric patterns in accordance with certain embodiments.

FIG. 5 illustrates a flow for image morphing to meet desired constraints in geometric patterns in accordance with certain embodiments. One or more operations of the flow may be performed by any suitable computing system or other components, such as extraction system 430, computing system 600, or computing system 700, or a computing system including any of the components of these computing systems.

At 502, design rule constraint (DRC) checks are performed on one or more patterns of a semiconductor chip. For each pattern, a determination is made as to whether the pattern is a clean pattern (e.g., does not violate any of the design rule constraints) or a dirty pattern (e.g., violates one or more of the design rule constraints).

At 504, pattern information is determined for at least a subset of the patterns of the semiconductor chip and then stored in a database (e.g., database 508) at 506. The pattern information may include a representation of the patterns or other information associated with the patterns (e.g., whether the pattern is classified as clean or dirty). In a particular embodiment, pattern information is determined for each of the clean patterns and/or dirty patterns. In other embodiments, pattern information is determined for only a subset of the patterns (e.g., a set of patterns with sufficient diversity). In some embodiments, a single set of pattern information may be determined for identical or sufficiently similar patterns.

In a particular embodiment, pattern information may comprise (or include data based on) an image constructed according to the design of the pattern as indicated by a portion of a layout database file. In particular embodiments, the image may include different colors for different materials of the chip so as to distinguish between the various layers of the chip. For example, polygons of a first layer may be assigned to a first color while polygons of a second layer may be assigned to a different color.

In one embodiment, the pattern information may include feature values for various features of the pattern. For example, such features may include geometric properties of the layout of the pattern and/or image properties of an image of the pattern.

Geometric properties may include, for example, one or more distances between polygons of the pattern, one or more widths and/or lengths of one or more polygons of the pattern, an indication of an amount of overlap between adjacent layers, a measure of an offset between two layers, information about the relative placement of polygons within the pattern, or other suitable properties associated with the geometry of the polygons of the pattern.

Image properties may include any suitable information derived from an image that allows for comparison of the similarities of the images. In general, any image properties used in computer vision (e.g., via principle component analysis) may be derived from with the images and stored in the database. 'As an example, an image may comprise a single layer (e.g., a metal layer) of polygons inside a window around the DRC violation (or other anchor point). The polygons may be assigned one color (e.g., black) and the non-polygon area may be assigned a different color (e.g., white). The polygons in black and the background in white may collectively form a black-and-white image, which may be processed according to any suitable computer vision techniques. For example, eigen faces may be derived from a collection of these images (e.g., a learning portion). Any suitable algorithms may be used to derive the eigen faces, such as the algorithms suggested by Sirovich and Kirby. Once a set of eigen faces has been derived, each image can be represented as a vector of weights that are used to reconstitute the image by performing a weighted sum of the eigen faces. The vector of weights of a particular image can be compared with a vector of weights of a different image to compare the similarity of the two images. When multiple layers are being considered together, the image properties may be derived from an array of images that each correspond to a different layer of the chip.

At 510, a dirty pattern is identified. In various embodiments, the dirty pattern (or an identifier or representation thereof) may have been stored in pattern database 508 or other storage after the DRC checks of 502.

At 512, clean patterns that are similar to the dirty pattern are identified. As an example, pattern database 508 may be searched to identify the similar patterns. In particular embodiments, pattern database 508 may be indexed or otherwise organized to facilitate relatively rapid identification of the similar patterns. The number of clean patterns that are identified at 512 may be fixed (e.g., the closest 50 patterns) or may be dynamic and vary from iteration to iteration (e.g., all patterns that meet particular criteria may be identified or all patterns below a threshold number of patterns that meet particular criteria are identified).

In a particular embodiment, the pattern information may be stored in a hierarchical graph based storage arrangement. As explained above, a set of pattern information corresponding to a particular pattern may be stored as a vector of feature values. For a particular feature, the feature values for the various clean patterns may be stored in a graph based form so that a subset of patterns that have a feature value matching the desired range may be quickly identified. Each different type of feature may similarly have feature values arranged in a graph. In another embodiment, a single graph may include nodes with each of the feature values. For example, the feature values may be stored using a K-Dimensional Tree, in which each node (where a node corresponds to a pattern) is a K-Dimensional point in a search space (where the K dimensions correspond to K different features).

As an example, if the identified dirty pattern has a feature value of 25 nanometers for a particular feature of interest (e.g., a length of a particular polygon), a search may be made in the graph corresponding to that feature for patterns having feature values within a range (e.g., 23-27 nanometers) that includes the feature value. The search of the graph may allow a quick determination of the patterns that have the feature values within the range. Other graphs may be similarly searched based on feature values of other features of the dirty pattern. In various embodiments, the clean patterns that are found in each search of the graphs, in the most searches of the graphs, in a specified subset of the graphs that are associated with the most relevant features, or in a specified number of searches of the graphs are returned as the similar clean patterns at 512.

In one embodiment in which data is stored in different graphs for different features, clustering may be performed based on one feature to identify a subset of patterns that may be similar to the dirty pattern (as indicated by similarities for that feature), then clustering is performed on the subset of patterns data using the second feature to further narrow the patterns that may be similar to the dirty pattern (as indicated by similarities for the second feature), and so on.

In particular embodiments, the graphs may be searched in order of feature importance. For example, the first search may be made using the graph that has feature values of the feature that is deemed to be the most important, the second search may be made using the graph that has feature values of the feature that is deemed to be the second most important, and so on. The order of importance of the features may be specified in any suitable manner. For example, the order may be entered by one or more users based on experience and domain knowledge or learned over time based on results produced by the system. For example, an initial order may be used to prioritize the search results to users, but users may select search results that are lower in the results presented to the users. Over time, the user's preferences for certain features may be learned based on the user selections. In various embodiments, the selections made by users (upon which the preferences for particular features is based) may be performed prior to the morphing of the images (explained in more detail below) and/or based on the selections of morphed images.

In some embodiments, to efficiently find similar patterns in a large database, a feature-based hashing scheme may be used to index the clean patterns in the database. Feature values may be hashed to reduce the bounds of the feature space. The feature values may be hashed in any suitable manner. As an example, instead of storing an exact feature value, a hash representing the feature value or a range of feature values is stored. As an example, feature values such as 50, 51, 52, 53, and 54 nanometers may each be hashed to the same value. In various embodiments, the hashes of the various patterns may be stored separately by feature. For example, the hashes of a particular feature for various patterns are stored together, the hashes of another feature for the various patterns are stored together separately, and so on. As another example, all (or a subset) of the feature values for a particular pattern are hashed and the results are concatenated together or otherwise stored together in an entry for the particular pattern and the entry is stored together with similar entries for other patterns as indices to the patterns. When similar patterns are searched for, one or more feature values of the dirty pattern may be hashed (using the same hashing functions used to hash the feature values of the clean patterns) and the resulting hash values may be compared against hash values of the clean patterns to find patterns with hash values that match the hash values of the dirty pattern (or hash values that are close to the hash values of the dirty pattern). Different features may be hashed in different manners. For example, a hash function for a width may be different from a hash function for a length. As another example, eigen spaces may be used as hashes of images of patterns. In some embodiments, a hash value (or collection of hash values) for a pattern may include a portion for one or more hashed feature values of geometric properties and a portion for one or more hashed feature values of image properties.

In another embodiment, a distance function may be used to determine similarity of the clean patterns to the dirty pattern. A distance function may calculate a distance metric representing the measure of similarity between a first pattern (e.g., the dirty pattern) and a second pattern (e.g., one of the clean patterns). The distance function may be calculated using the differences between feature values of the first pattern and the second pattern. For example, the differences may include a measure of a difference between the feature value of a first feature for the first pattern and the feature value of the first feature for the second pattern, a measure of a difference between the feature value of a second feature for the first pattern and the feature value of the second feature for the second pattern, and so on. In some embodiments, the differences may be normalized and/or weighted and then summed or otherwise combined to generate the result of the distance function. After the results of the distance function are generated for pairs each including the dirty pattern and one of the clean patterns, the results may be sorted to determine which pairs are most similar.

After finding similar clean patterns, the dirty pattern identified at 510 is morphed based on the similar patterns identified at 512. For example, the dirty pattern is morphed based on a first clean pattern to generate a first morphed pattern that looks more like the first clean pattern than the dirty pattern does. The dirty pattern is also morphed based on a second clean pattern to generate a second morphed pattern that looks more like the second clean pattern than the dirty pattern does. Similarly, the dirty pattern is morphed to generate additional morphed patterns based on the other clean patterns identified at 512.

In various embodiments, the morphing may be accomplished using standard image morphing techniques based on images representing the dirty pattern and the respective clean pattern. Such morphing techniques may include, e.g., one or more of cross-dissolving, the Beier-Neely or other field morphing algorithms, triangulation based morphing, mesh warping, field morphing, moving least square, as rigid as possible interpolation, radial basis functions/thin plate splines, forward or inverse warping, or other suitable morphing techniques. In some embodiments, the morphing operation may perform a linear optimization of multiple features.

The patterns corresponding to the morphed images may be checked to determine whether they are valid. A pattern may be valid if it is a clean pattern and has circuit connectivity that is equivalent to the circuit connectivity of the original dirty pattern. In a particular embodiment, if the morphed pattern is not valid, it may be discarded (and not used in subsequent operations of the flow) or modified until it is valid. For example, if morphing causes a via to be displaced from a metal line coupled to the via, the metal line may be moved as well to achieve the original connectivity.

In various embodiments, the morphing may include changing the shape or size of polygons within the dirty pattern. Additionally or alternatively, in some embodiments, the morphing may include process-specific custom changes. For example, the morphing may include moving a polygon located in a particular layer to a different layer (provided the resulting pattern is still valid). For example, if two vias are too close together and multi-patterning is enabled by the particular process being used, one of the vias may be moved to a different layer). As another example, the morphing may align multiple line-ends to simplify the line end cuts in a double patterning process.

In some embodiments, the morphing techniques may be used in conjunction with the design rules or other parameters specifying allowable values for the geometric shapes that are morphed. For example, if a particular morphing technique specifies that a length of a polygon should be changed from 46 nm to 53.4 nm, but only whole numbers are allowed for the length, the result may be rounded to 53 nm.

After the dirty pattern has been morphed in various ways to generate morphed patterns, a plurality of the morphed patterns are selected and presented to a user at 516. In some embodiments, the morphed patterns are presented via an electronic display to a user. In some embodiments, the morphed patterns may be communicated over a network interface and a network to a computing system of the user. Other embodiments contemplate any suitable methods for presenting the morphed patterns to the user for selection.

The interface used to communicate the morphed patterns may present any suitable information associated with the morphed patterns. As an example, the interface may display images of each of the morphed patterns. As another example, the interface may display timing characteristics of each of the morphed patterns, such as an approximated change in signal timing (e.g., the amount of time for an electrical signal to propagate through one or more circuits of the morphed pattern) relative to the dirty pattern based on circuit parameters of the morphed pattern. In some embodiments, the interface may include a textual summary of the changes to the dirty pattern made in each morphed pattern.

In a particular embodiment, a subset of the morphed patterns are selected for presentation to the user. In some embodiments, all of the morphed patterns may be presented for presentation. In various embodiments, a threshold number of morphed patterns or criteria (e.g., a degree of similarity between the dirty pattern and each of the morphed patterns) is set and used to limit the number of morphed patterns that are presented to the user.

In particular embodiments, the morphed patterns that are selected to present to the user are selected based on their similarity to the dirty pattern. For example, the N closest morphed patterns may be selected for presentation, where N is any suitable integer, and where the closest morphed patterns represent the morphed patterns that have undergone the least amount of shape changes. The degree of similarity between a morphed pattern and the dirty pattern may be measured in any suitable manner. For example, any of the functions described above for identifying the similar patterns at 512 may be used to determine a measure of similarity.

In some embodiments, the morphed patterns that are selected to present to the user may be based on a machine learning model 520, which is adaptively updated based on actual user selections of morphed patterns to replace dirty patterns (as described in conjunction with 518).

At 518, a user selects a morphed pattern 522 to replace the dirty pattern. In some embodiments, if the dirty pattern is the repeated in the chip design, the morphed pattern may replace multiple instances of the dirty pattern. The morphed pattern may then be stored in pattern database 508 as a clean pattern in a manner similar to that described above for the other clean patterns.

Since a human user may prefer certain types of changes to the input pattern (i.e., the dirty pattern) over other types of changes, various embodiments provide an interface for one or more users to select from a set of morphed patterns.

Furthermore, the user preferences can be used to train a machine learning model (e.g., a neural net, support vector machine, or other suitable machine learning model) that influences the identification of similar patterns at 512 for future iterations of the flow (e.g., for other dirty patterns) and/or the selection of the closest morphed patterns at 516 by selecting patterns that are more likely to be preferred by users. For example, over time, the selections made by one or more users may indicate a general preference for particular types of changes or the degree to which a particular type of change is preferred relative to another type of change. For example, a layer change (e.g., moving a polygon from one layer to another layer) may be preferred over changing the size of the polygon. As another example, changing the size of the polygon may be preferred over a layer change, but only to a certain degree (e.g., if the size change is less than 25% the size change may be preferred, but if the size change is more than 25% the layer change may be preferred). The preferences captured by the model 520 may be used to modify the way that similarity between two patterns is measured. For example, if a particular type of change (e.g., a change of a particular feature) is preferred, then a first difference in feature values for that feature may be weighted less heavily in a function calculating the difference between two images than a second difference in feature values for another feature for which a preference has not been shown when the first difference and second difference have similar magnitudes. As another example, if a preference for a change of a particular feature type is preferred, the hashing function for that feature may be modified (e.g., such that a particular hash value encompasses a wider range of values of that feature).

Although the present disclosure describes various embodiments useful in the context of semiconductor manufacturing, the embodiments may be used in other contexts to morph an unacceptable geometric pattern into an acceptable geometric pattern. For example, teachings of the present disclosure may be used in the machining of parts to determine the simplest or best way to transition from one part having a particular shape to a different shape. As another example, teachings of the present disclosure may be used to determine the content of a floor space (e.g., a factory, warehouse, or retail store floor space) to comply with an inventory control system. In addition, the preferences used to train the model 520 may be extended from one chip to another chip (that is preferences captured during morphing of patterns for one chip may be used to inform determinations made during morphing of patterns for another chip of the same or different technology process).

Figure 6:
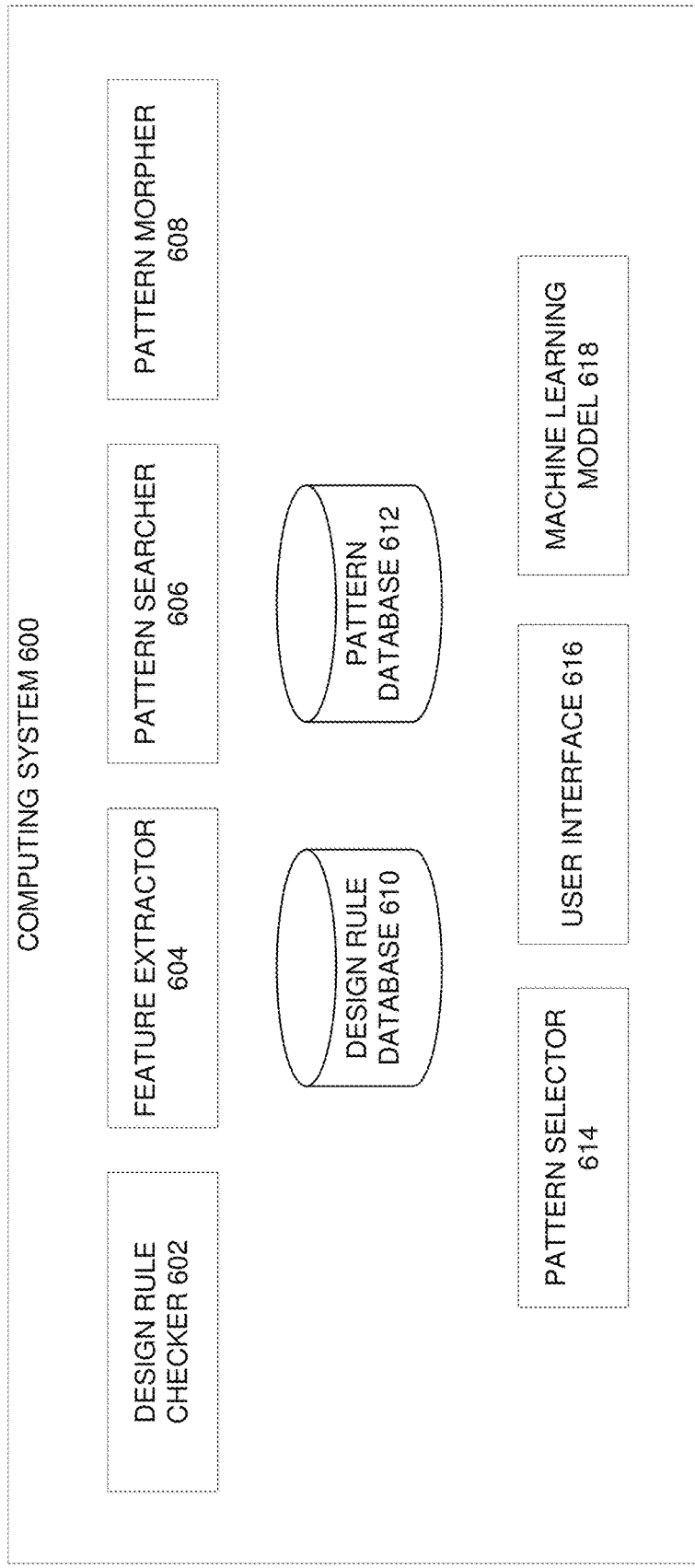
FIG. 6 illustrates a computing system for image morphing to meet desired constraints in geometric patterns in accordance with certain embodiments.

FIG. 6 illustrates a computing system 600 for image morphing to meet desired constraints in geometric patterns in accordance with certain embodiments. In various embodiments, the system 600 may perform the flow 500 or other ancillary operations. In the embodiment depicted, computing system 600 includes a design rule checker 602, feature extractor 604, pattern searcher 606, pattern morpher 608, design rule database 610, pattern database 612, pattern selector 614, user interface 616, and machine learning model 618.

Design rule checker 602 may apply a plurality of design rules stored in database 610 (which in some embodiments may have one or more of the characteristics of design rule database 450) against a plurality of geometric patterns of a semiconductor chip design to determine whether the patterns are clean or dirty. The design rule checker 602 may also apply the design rules to morphed patterns output by pattern morpher 608 to determine whether the morphed patterns are dirty or clean.

Feature extractor 604 analyzes both clean and dirty patterns and determines feature values of the patterns. Feature extractor 604 may extract any suitable feature values, such as any of those described above or other feature values. The feature values determined by feature extractor 604 may be stored in association with their respective patterns (or identifications or representations thereof) in pattern database 612. The feature values may be represented within pattern database 612 in a manner that is easily searchable as described above.

Pattern searcher 606 may access pattern database 612 to find patterns that are similar to an input pattern (e.g., a dirty pattern). Pattern morpher 608 may morph an input pattern based on a similar pattern to generate a morphed pattern. During an iteration, the pattern morpher 608 may generate a plurality of morphed patterns with each pattern based on the input pattern a respective similar pattern. Pattern selector 614 may analyze the morphed patterns and select patterns from the morphed patterns to present to the user via a user interface 616. The user may select a morphed pattern to use in place of the dirty pattern via the user interface 616. The selection may be reported to a machine learning model 618 (which in various embodiments may have any one or more of the characteristics of machine learning model 520), which may be used to inform the searching of patterns by pattern searcher 606 or the selection of patterns by pattern selector 614.

Figure 7:
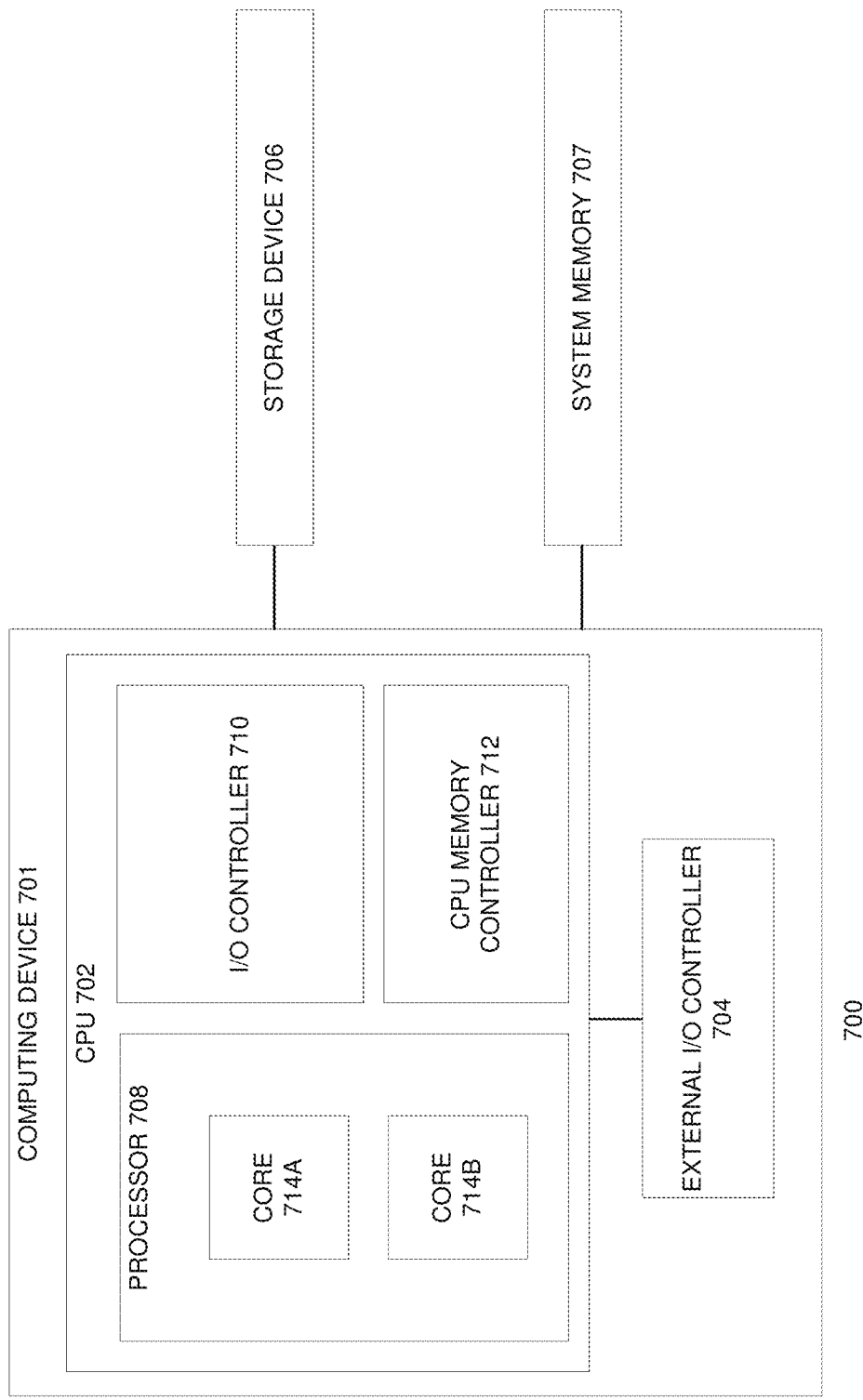
FIG. 7 illustrates a computing system in accordance with certain embodiments.

FIG. 7 illustrates a computing system 700 in accordance with certain embodiments. Any suitable components of system 700 may be used to perform any of the operations described herein, e.g., in connection with FIGS. 4-6. In a particular embodiment, the components of computing system 600 may be implemented using components of computing system 700. In some embodiments, extraction system 430 or a computing system utilized by a user 440 to communicate with extraction system 430 may implement one or more components of system 700. System 700 includes a computing device 701 comprising a central processing unit (CPU) 702 coupled to an external input/output (I/O) controller 704, storage device 706 (which in some embodiments may store at least a portion of silicon data 420 and/or data of database 610 or 612), and system memory 707. Although various components are illustrated, computing system 700 may include additional other components or multiples of the components illustrated.

During operation, data may be transferred between storage device 706 or system memory 707 and the CPU 702. In various embodiments, particular data operations (e.g., erase, program, and read operations) involving a storage device 706 or system memory 707 may be managed by an operating system or other software application executed by processor 708.

CPU 702 comprises a processor 708, such as a microprocessor, an embedded processor, a digital signal processor (DSP), a network processor, a handheld processor, an application processor, a co-processor, a system on a chip (SOC), or other device to execute code (i.e., software instructions). Processor 708, in the depicted embodiment, includes two processing elements (cores 714A and 714B in the depicted embodiment), which may include asymmetric processing elements or symmetric processing elements. However, a processor may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core 714 may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

In various embodiments, the processing elements may also include one or more arithmetic logic units (ALUs), floating point units (FPUs), caches, instruction pipelines, interrupt handling hardware, registers, or other hardware to facilitate the operations of the processing elements.

I/O controller 710 is an integrated I/O controller. I/O controller 710 may include logic for communicating data between CPU 702 and I/O devices, which may refer to any suitable devices capable of transferring data to and/or receiving data from an electronic system, such as CPU 702. For example, an I/O device may comprise an audio/video (A/V) device controller such as a graphics accelerator or audio controller; a data storage device controller, such as a flash memory device, magnetic storage disk, or optical storage disk controller; a wireless transceiver; a network processor; a network interface controller; or a controller for another input devices such as a monitor, printer, mouse, keyboard, or scanner; or other suitable device. In a particular embodiment, an I/O device may comprise a storage device 706 that may be coupled to the CPU 702 through I/O controller 710.

An I/O device may communicate with the I/O controller 710 of the CPU 702 using any suitable signaling protocol, such as peripheral component interconnect (PCI), PCI Express (PCIe), Universal Serial Bus (USB), Serial Attached SCSI (SAS), Serial ATA (SATA), Fibre Channel (FC), IEEE 802.3, IEEE 802.11, or other current or future signaling protocol. In particular embodiments, I/O controller 710 and the underlying I/O device may communicate data and commands in accordance with a logical device interface specification such as Non-Volatile Memory Express (NVMe) (e.g., as described by one or more of the specifications available at www.nvmexpress.org/specifications/) or Advanced Host Controller Interface (AHCI) (e.g., as described by one or more AHCI specifications such as Serial ATA AHCI: Specification, Rev. 1.3.1 available at http://www.intel.com/content/www/us/en/io/serial-ata/serial-ata-ahci-spec-rev1-3-1.html). In various embodiments, I/O devices coupled to the I/O controller may be located off-chip (i.e., not on the same chip as CPU 702) or may be integrated on the same chip as the CPU 702.

CPU memory controller 712 is an integrated memory controller. CPU memory controller may include logic to control the flow of data going to and from one or more system memories 707. CPU memory controller 712 may include logic operable to read from a system memory 707, write to a system memory 707, or to request other operations from a system memory 707. In various embodiments, CPU memory controller 712 may receive write requests from cores 714 and/or I/O controller 710 and may provide data specified in these requests to a system memory 707 for storage therein. CPU memory controller 712 may also read data from a system memory 707 and provide the read data to I/O controller 710 or a core 714. During operation, CPU memory controller 712 may issue commands including one or more addresses of the system memory 707 in order to read data from or write data to memory (or to perform other operations). In some embodiments, CPU memory controller 712 may be implemented on the same chip as CPU 702, whereas in other embodiments, CPU memory controller 712 may be implemented on a different chip than that of CPU 702. I/O controller 710 may perform similar operations with respect to one or more storage devices 706.

The CPU 702 may also be coupled to one or more other I/O devices through external I/O controller 704. In a particular embodiment, external I/O controller 704 may couple a storage device 706 to the CPU 702. External I/O controller 704 may include logic to manage the flow of data between one or more CPUs 702 and I/O devices. In particular embodiments, external I/O controller 704 is located on a motherboard along with the CPU 702. The external I/O controller 704 may exchange information with components of CPU 702 using point-to-point or other interfaces. In various embodiments, external I/O controller 704 may include any one or more characteristics of memory controller 110.

A system memory 707 may store any suitable data, such as data used by processor 708 to provide the functionality of computer system 700. For example, data associated with programs that are executed or files accessed by cores 714 may be stored in system memory 707. Thus, a system memory 707 may include a system memory that stores data and/or sequences of instructions that are executed or otherwise used by the cores 714. In various embodiments, a system memory 707 may store persistent data (e.g., a user's files or instruction sequences) that remains stored even after power to the system memory 707 is removed. A system memory 707 may be dedicated to a particular CPU 702 or shared with other devices (e.g., one or more other processors or other devices) of computer system 700.

In various embodiments, a system memory 707 may include a memory comprising any number of memory arrays, a memory device controller (In various embodiments, the memory device controller may include any one or more characteristics of memory controller 110), and other supporting logic (not shown). A memory array may include non-volatile memory and/or volatile memory. Non-volatile memory is a storage medium that does not require power to maintain the state of data stored by the medium. Nonlimiting examples of nonvolatile memory may include any or a combination of: solid state memory (such as planar or 3D NAND flash memory or NOR flash memory), 3D crosspoint memory, memory devices that use chalcogenide phase change material (e.g., chalcogenide glass), byte addressable nonvolatile memory devices, ferroelectric memory, siliconoxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMS), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. Volatile memory is a storage medium that requires power to maintain the state of data stored by the medium. Examples of volatile memory may include various types of random access memory (RAM), such as dynamic random-access memory (DRAM) or static random-access memory (SRAM). One particular type of DRAM that may be used in a memory array is synchronous dynamic random-access memory (SDRAM). In some embodiments, any portion of memory 707 that is volatile memory can comply with JEDEC standards including but not limited to Double Data Rate (DDR) standards, e.g., DDR3, 4, and 5, or Low Power DDR4 (LPDDR4) as well as emerging standards.

A storage device 706 may store any suitable data, such as data used by processor 708 to provide functionality of computer system 700. For example, data associated with programs that are executed or files accessed by cores 714A and 714B may be stored in storage device 706. Thus, in some embodiments, a storage device 706 may store data and/or sequences of instructions that are executed or otherwise used by the cores 714A and 714B. In various embodiments, a storage device 706 may store persistent data (e.g., a user's files or software application code) that remains stored even after power to the storage device 706 is removed. A storage device 706 may be dedicated to CPU 702 or shared with other devices (e.g., another CPU or other device) of computer system 700.

In various embodiments, storage device 706 includes a storage device controller and one or more memory modules. In various embodiments, a memory module of storage device 706 comprises one or more NAND flash memory arrays, one or more hard disk drives, or other suitable memory storage devices. Storage device 706 may comprise any suitable type of memory and is not limited to a particular speed, technology, or form factor of memory in various embodiments. For example, a storage device 706 may be a disk drive (such as a solid-state drive), a flash drive, memory integrated with a computing device (e.g., memory integrated on a circuit board of the computing device), a memory module (e.g., a dual in-line memory module) that may be inserted in a memory socket, or other type of storage device. Moreover, computer system 700 may include multiple different types of storage devices. Storage device 706 may include any suitable interface to communicate with CPU memory controller 712 or I/O controller 710 using any suitable communication protocol such as a DDR-based protocol, PCI, PCIe, USB, SAS, SATA, FC, System Management Bus (SMBus), or other suitable protocol. A storage device 706 may also include a communication interface to communicate with CPU memory controller 712 or I/O controller 710 in accordance with any suitable logical device interface specification such as NVMe, AHCI, or other suitable specification. In particular embodiments, storage device 706 may comprise multiple communication interfaces that each communicate using a separate protocol with CPU memory controller 712 and/or I/O controller 710.

In some embodiments, all, or some of the elements of system 700 are resident on (or coupled to) the same circuit board (e.g., a motherboard). In various embodiments, any suitable partitioning between the elements may exist. For example, the elements depicted in CPU 702 may be located on a single die (i.e., on-chip) or package or any of the elements of CPU 702 may be located off-chip or off-package. Similarly, the elements depicted in storage device 706 may be located on a single chip or on multiple chips. In various embodiments, a storage device 706 and a computing device (e.g., CPU 702) may be located on the same circuit board or on the same device and in other embodiments the storage device 706 and the computing device may be located on different circuit boards or devices.

The components of system 700 may be coupled together in any suitable manner. For example, a bus may couple any of the components together. A bus may include any known interconnect, such as a multi-drop bus, a mesh interconnect, a ring interconnect, a point-to-point interconnect, a serial interconnect, a parallel bus, a coherent (e.g. cache coherent) bus, a layered protocol architecture, a differential bus, and a Gunning transceiver logic (GTL) bus. In various embodiments, an integrated I/O subsystem includes point-to-point multiplexing logic between various components of system 700, such as cores 714, one or more CPU memory controllers 712, I/O controller 710, integrated I/O devices, direct memory access (DMA) logic (not shown), etc. In various embodiments, components of computer system 700 may be coupled together through one or more networks comprising any number of intervening network nodes, such as routers, switches, or other computing devices. For example, a computing device (e.g., CPU 702) and the storage device 706 may be communicably coupled through a network.

Although not depicted, system 700 may use a battery and/or power supply outlet connector and associated system to receive power, a display to output data provided by CPU 702, or a network interface allowing the CPU 702 to communicate over a network. In various embodiments, the battery, power supply outlet connector, display, and/or network interface may be communicatively coupled to CPU 702. Other sources of power can be used such as renewable energy (e.g., solar power or motion based power).

Figure 8:
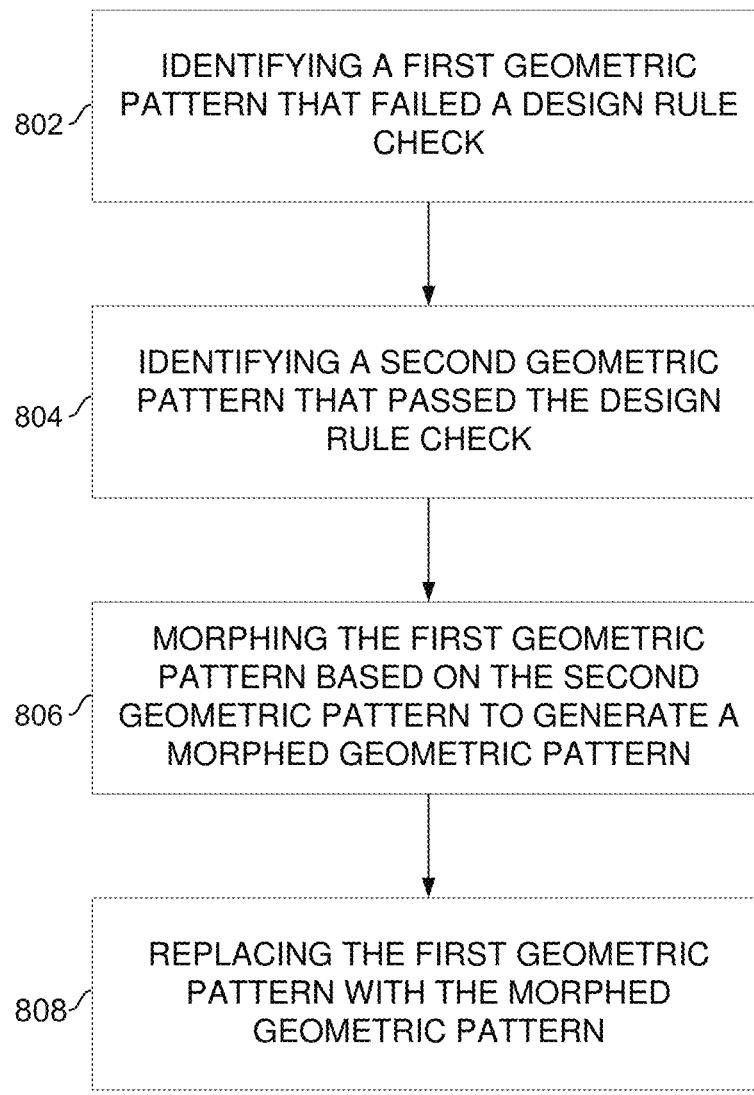
FIG. 8 illustrates a flow for replacing a dirty pattern with a clean pattern in accordance with certain embodiments.

FIG. 8 illustrates a flow for replacing a dirty pattern with a clean pattern in accordance with certain embodiments. The flow may be performed by any suitable computing system, such as those described herein.

802 comprises identifying a first geometric pattern that failed a design rule check. 804 comprises identifying a second geometric pattern that passed the design rule check. 806 comprises morphing the first geometric pattern based on the second geometric pattern to generate a morphed geometric pattern, wherein the morphed geometric pattern passes the design rule check. 808 comprises replacing the first geometric pattern with the morphed geometric pattern.

A design may go through various stages, from creation to simulation to fabrication. Data representing a design may represent the design in a number of manners. First, as is useful in simulations, the hardware may be represented using a hardware description language (HDL) or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In some implementations, such data may be stored in a database file format such as Graphic Data System II (GDS II), Open Artwork System Interchange Standard (OASIS), or similar format.

In some implementations, software based hardware models, and HDL and other functional description language objects can include register transfer language (RTL) files, among other examples. Such objects can be machine-parsable such that a design tool can accept the HDL object (or model), parse the HDL object for attributes of the described hardware, and determine a physical circuit and/or on-chip layout from the object. The output of the design tool can be used to manufacture the physical device. For instance, a design tool can determine configurations of various hardware and/or firmware elements from the HDL object, such as bus widths, registers (including sizes and types), memory blocks, physical link paths, fabric topologies, among other attributes that would be implemented in order to realize the system modeled in the HDL object. Design tools can include tools for determining the topology and fabric configurations of system on chip (SoC) and other hardware device. In some instances, the HDL object can be used as the basis for developing models and design files that can be used by manufacturing equipment to manufacture the described hardware. Indeed, an HDL object itself can be provided as an input to manufacturing system software to cause the described hardware.

In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

In various embodiments, a medium storing a representation of the design may be provided to a manufacturing system (e.g., a semiconductor manufacturing system capable of manufacturing an integrated circuit and/or related components). The design representation may instruct the system to manufacture a device capable of performing any combination of the functions described above. For example, the design representation may instruct the system regarding which components to manufacture, how the components should be coupled together, where the components should be placed on the device, and/or regarding other suitable specifications regarding the device to be manufactured.

Various components (e.g., design rule checker 602, feature extractor 604, pattern searcher 606, pattern morpher 608, pattern selector 614, user interface 616, or machine learning model 618) described herein may be implemented as modules. A module as used herein refers to circuitry and any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Logic may be used to implement any of the flows described or functionality of the various components such as the components of extraction system 430, the computing system of user 440, computing system 600, computing system 700, subcomponents thereof, or other entity or component described herein. "Logic" may refer to hardware, firmware, software and/or combinations of each to perform one or more functions. In various embodiments, logic may include a microprocessor or other processing element operable to execute software instructions, discrete logic such as an application specific integrated circuit (ASIC), a programmed logic device such as a field programmable gate array (FPGA), a storage device containing instructions, combinations of logic devices (e.g., as would be found on a printed circuit board), or other suitable hardware and/or software. Logic may include one or more gates or other circuit components. In some embodiments, logic may also be fully embodied as software. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in storage devices.

Use of the phrase 'to' or 'configured to,' in one embodiment, refers to arranging, putting together, manufacturing, offering to sell, importing, and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example, the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash storage devices; electrical storage devices; optical storage devices; acoustical storage devices; other form of storage devices for holding information received from transitory (propagated) signals (e.g., carrier waves, infrared signals, digital signals); etc., which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer).

The following examples pertain to embodiments in accordance with this Specification. Example 1 is at least one machine readable storage medium having instructions stored thereon, the instructions when executed by a machine to cause the machine to identify a first geometric pattern that failed a design rule check; identify a second geometric pattern that passed the design rule check; morph the first geometric pattern based on the second geometric pattern to generate a morphed geometric pattern, wherein the morphed geometric pattern passes the design rule check; and replace the first geometric pattern with the morphed geometric pattern.

Example 2 may include the subject matter of example 1, the instructions when executed by a machine to cause the machine to identify a first plurality of geometric patterns that passed the design rule check; and morph the first geometric pattern into a first plurality of morphed geometric patterns, wherein each of the morphed geometric patterns is based on the first geometric pattern and a respective one of the first plurality of morphed geometric patterns.

Example 3 may include the subject matter of example 2, the instructions when executed by a machine to cause the machine to identify the first plurality of geometric patterns from a second plurality of geometric patterns that passed the design rule check based on similarities between the first plurality of geometric patterns and the first geometric pattern.

Example 4 may include the subject matter of example 3, wherein the similarities are determined based on a comparison of feature values of a plurality of different types of features of the first geometric pattern with corresponding feature values of each of the first plurality of geometric patterns.

Example 5 may include the subject matter of example 4, wherein the plurality of different types of features include at least one of a length of a polygon in the first geometric pattern, a width of a polygon in the first geometric pattern, and an eigen vector of an image of the first geometric pattern.

Example 6 may include the subject matter of any of examples 2-5, the instructions when executed by a machine to cause the machine to identify a subset of the first plurality of morphed geometric patterns to present for a selection, wherein the identification of the subset is based on relative similarities between the first geometric pattern and each of the first plurality of morphed geometric patterns.

Example 7 may include the subject matter of example 6, the instructions when executed by a machine to cause the machine to replace the first geometric pattern with the morphed geometric pattern responsive to the selection, wherein the selection chooses the morphed geometric pattern from among the subset of the first plurality of morphed geometric patterns.

Example 8 may include the subject matter of any of examples 6-7, the instructions when executed by a machine to cause the machine to update a machine learning model based on the selection, wherein the machine learning model tracks user preferences for particular types of feature changes.

Example 9 may include the subject matter of example 8, the instructions when executed by a machine to cause the machine to utilize the machine learning model to identify the first plurality of geometric patterns that passed the design rule check.

Example 10 may include the subject matter of any of examples 1-9, wherein the first geometric pattern is a pattern defined by a portion of a layout database file for a semiconductor chip.

Example 11 is a method comprising identifying a first geometric pattern that failed a design rule check; identifying a second geometric pattern that passed the design rule check; morphing the first geometric pattern based on the second geometric pattern to generate a morphed geometric pattern, wherein the morphed geometric pattern passes the design rule check; and replacing the first geometric pattern with the morphed geometric pattern.

Example 12 may include the subject matter of example 11, further comprising identifying a first plurality of geometric patterns that passed the design rule check; and morphing the first geometric pattern into a first plurality of morphed geometric patterns, wherein each of the morphed geometric patterns is based on the first geometric pattern and a respective one of the first plurality of morphed geometric patterns.

Example 13 may include the subject matter of example 12, further comprising identifying the first plurality of geometric patterns from a second plurality of geometric patterns that passed the design rule check based on similarities between the first plurality of geometric patterns and the first geometric pattern.

Example 14 may include the subject matter of example 13, wherein the similarities are determined based on a comparison of feature values of a plurality of different types of features of the first geometric pattern with corresponding feature values of each of the first plurality of geometric patterns.

Example 15 may include the subject matter of example 14, wherein the plurality of different types of features include at least one of a length of a polygon in the first geometric pattern, a width of a polygon in the first geometric pattern, and an eigen vector of an image of the first geometric pattern.

Example 16 may include the subject matter of any of examples 12-15, further comprising identifying a subset of the first plurality of morphed geometric patterns to present for a selection, wherein the identification of the subset is based on relative similarities between the first geometric pattern and each of the first plurality of morphed geometric patterns.

Example 17 may include the subject matter of example 16, further comprising replacing the first geometric pattern with the morphed geometric pattern responsive to the selection, wherein the selection chooses the morphed geometric pattern from among the subset of the first plurality of morphed geometric patterns.

Example 18 may include the subject matter of any of examples 16-17, further comprising updating a machine learning model based on the selection, wherein the machine learning model tracks user preferences for particular types of feature changes.

Example 19 may include the subject matter of example 18, further comprising utilizing the machine learning model to identify the first plurality of geometric patterns that passed the design rule check.

Example 20 may include the subject matter of any of examples 11-19, wherein the first geometric pattern is a pattern defined by a portion of a layout database file for a semiconductor chip.

Example 21 is an apparatus comprising a memory to store identifications of geometric patterns that passed a design rule check; and a processor coupled to the memory, the processor to identify a first geometric pattern that failed the design rule check; identify a second geometric pattern that passed the design rule check; morph the first geometric pattern based on the second geometric pattern to generate a morphed geometric pattern, wherein the morphed geometric pattern passes the design rule check; and replace the first geometric pattern with the morphed geometric pattern.

Example 22 may include the subject matter of example 21, the processor to identify a first plurality of geometric patterns that passed the design rule check; and morph the first geometric pattern into a first plurality of morphed geometric patterns, wherein each of the morphed geometric patterns is based on the first geometric pattern and a respective one of the first plurality of morphed geometric patterns.

Example 23 may include the subject matter of example 22, the processor to identify the first plurality of geometric patterns from a second plurality of geometric patterns that passed the design rule check based on similarities between the first plurality of geometric patterns and the first geometric pattern.

Example 24 may include the subject matter of example 23, wherein the similarities are determined based on a comparison of feature values of a plurality of different types of features of the first geometric pattern with corresponding feature values of each of the first plurality of geometric patterns.

Example 25 may include the subject matter of example 24, wherein the plurality of different types of features include at least one of a length of a polygon in the first geometric pattern, a width of a polygon in the first geometric pattern, and an eigen vector of an image of the first geometric pattern.

Example 26 may include the subject matter of any of examples 22-25, the processor to identify a subset of the first plurality of morphed geometric patterns to present for a selection, wherein the identification of the subset is based on relative similarities between the first geometric pattern and each of the first plurality of morphed geometric patterns.

Example 27 may include the subject matter of example 26, the processor to replace the first geometric pattern with the morphed geometric pattern responsive to the selection, wherein the selection chooses the morphed geometric pattern from among the subset of the first plurality of morphed geometric patterns.

Example 28 may include the subject matter of any of examples 26-27, the processor to update a machine learning model based on the selection, wherein the machine learning model tracks user preferences for particular types of feature changes.

Example 29 may include the subject matter of example 28, the processor to utilize the machine learning model to identify the first plurality of geometric patterns that passed the design rule check.

Example 30 may include the subject matter of any of examples 21-29, wherein the first geometric pattern is a pattern defined by a portion of a layout database file for a semiconductor chip.

Example 31 may include the subject matter of any of examples 21-30, further comprising one or more of a battery communicatively coupled to the processor, a display communicatively coupled to the processor, or a network interface communicatively coupled to the processor.

Example 32 may include the subject matter of any of examples 1-9 wherein the first geometric pattern is a pattern of a floor space.

Example 33 may include the subject matter of any of examples 11-19 wherein the first geometric pattern is a pattern of a floor space.

Example 34 may include the subject matter of any of examples 21-29 or 31 wherein the first geometric pattern is a pattern of a floor space.

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. At least one non-transitory machine readable storage medium having instructions stored thereon, the instructions when executed by a machine to cause the machine to:
   identify a first geometric pattern that failed a design rule check for compliance with a set of layout design rules established for a manufacturing process;
   identify a first plurality of geometric patterns that passed the design rule check, wherein the first plurality of geometric patterns includes a second geometric pattern, wherein the first plurality of geometric patterns are identified from a second plurality of geometric patterns that passed the design rule check based on similarities between the first plurality of geometric patterns and the first geometric pattern;
   morph the first geometric pattern into a first plurality of morphed geometric patterns, wherein each of the morphed geometric patterns is based on the first geometric pattern and a respective one of the first plurality of geometric patterns, wherein morphing the first geometric pattern into the first plurality of morphed geometric patterns comprises morphing the first geometric pattern based on the second geometric pattern to generate a morphed geometric pattern, wherein the morphed geometric pattern passes the design rule check; and
   replace the first geometric pattern with the morphed geometric pattern.

2. The at least one medium of claim 1, wherein the similarities are determined based on a comparison of feature values of a plurality of different types of features of the first geometric pattern with corresponding feature values of each of the first plurality of geometric patterns.

3. The at least one medium of claim 2, wherein the plurality of different types of features include at least one of a length of a polygon in the first geometric pattern, a width of a polygon in the first geometric pattern, and an eigen vector of an image of the first geometric pattern.

4. The at least one medium of claim 1, the instructions when executed by a machine to cause the machine to identify a subset of the first plurality of morphed geometric patterns to present for a selection, wherein the identification of the subset is based on relative similarities between the first geometric pattern and each of the first plurality of morphed geometric patterns.

5. The at least one medium of claim 4, the instructions when executed by a machine to cause the machine to replace the first geometric pattern with the morphed geometric pattern responsive to the selection, wherein the selection chooses the morphed geometric pattern from among the subset of the first plurality of morphed geometric patterns.

6. The at least one medium of claim 4, the instructions when executed by a machine to cause the machine to update a machine learning model based on the selection, wherein the machine learning model tracks user preferences for particular types of feature changes.

7. The at least one medium of claim 6, the instructions when executed by a machine to cause the machine to utilize the machine learning model to identify the first plurality of geometric patterns that passed the design rule check.

8. The at least one medium of claim 1, wherein the first geometric pattern is a pattern defined by a portion of a layout database file for a semiconductor chip.

9. A method comprising:
   identifying a first geometric pattern that failed a design rule check for compliance with a set of layout design rules established for a manufacturing process;
   identifying a first plurality of geometric patterns that passed the design rule check, wherein the first plurality of geometric patterns includes a second geometric pattern, wherein the first plurality of geometric patterns are identified from a second plurality of geometric patterns that passed the design rule check based on similarities between the first plurality of geometric patterns and the first geometric pattern;
   morphing the first geometric pattern into a first plurality of morphed geometric patterns, wherein each of the morphed geometric patterns is based on the first geometric pattern and a respective one of the first plurality of geometric patterns, wherein morphing the first geometric pattern into the first plurality of morphed geometric patterns comprises morphing the first geometric pattern based on the second geometric pattern to generate a morphed geometric pattern, wherein the morphed geometric pattern passes the design rule check; and
   replacing the first geometric pattern with the morphed geometric pattern.

10. The method of claim 9, further comprising identifying a subset of the first plurality of morphed geometric patterns to present for a selection, wherein the identification of the subset is based on relative similarities between the first geometric pattern and each of the first plurality of morphed geometric patterns to the first geometric pattern.

11. The method of claim 10, further comprising replacing the first geometric pattern with the morphed geometric pattern responsive to the selection, wherein the selection chooses the morphed geometric pattern from among the subset of the first plurality of morphed geometric patterns.

12. An apparatus comprising:
   a memory to store identifications of geometric patterns that passed a design rule check for compliance with a set of layout design rules established for a manufacturing process; and
   a processor coupled to the memory, the processor to:
      identify a first plurality of geometric patterns that passed the design rule check, wherein the first plurality of geometric patterns includes a second geometric pattern, wherein the first plurality of geometric patterns are identified from a second plurality of geometric patterns that passed the design rule check based on similarities between the first plurality of geometric patterns and the first geometric pattern;

morph the first geometric pattern into a first plurality of morphed geometric patterns, wherein each of the morphed geometric patterns is based on the first geometric pattern and a respective one of the first plurality of geometric patterns, wherein morphing the first geometric pattern into the first plurality of morphed geometric patterns comprises morphing the first geometric pattern based on the second geometric pattern to generate a morphed geometric pattern, wherein the morphed geometric pattern passes the design rule check; and replace the first geometric pattern with the morphed geometric pattern.

13. The apparatus of claim 12, the processor to identify a subset of the first plurality of morphed geometric patterns to present for a selection, wherein the identification of the subset is based on relative similarities between the first geometric pattern and each of the first plurality of morphed geometric patterns to the first geometric pattern.

14. The apparatus of claim 12, further comprising one or more of a battery communicatively coupled to the processor, a display communicatively coupled to the processor, or a network interface communicatively coupled to the processor.

* * * * *